United States Patent [19]
Yamashita

[11] Patent Number: 5,493,703
[45] Date of Patent: Feb. 20, 1996

[54] PORTABLE RADIO DEVICE WITH ON-VEHICLE ADAPTOR SYSTEM

[75] Inventor: Osamu Yamashita, Tokyo, Japan

[73] Assignee: NEC Corporation, Japan

[21] Appl. No.: 276,446

[22] Filed: Jul. 18, 1994

[30] Foreign Application Priority Data

Jul. 23, 1993 [JP] Japan .................................. 5-202889

[51] Int. Cl.[6] .............................. H04B 1/38; H04Q 7/32
[52] U.S. Cl. ............................ 455/89; 455/90; 455/127; 455/349; 455/351; 379/58; 379/454
[58] Field of Search ............................ 455/89, 90, 127, 455/345, 346, 348, 349, 351, 33.1; 379/58, 59, 61, 433, 435, 441, 454

[56] References Cited

U.S. PATENT DOCUMENTS

| | | | |
|---|---|---|---|
| 5,054,115 | 10/1991 | Sawa et al. | 455/89 |
| 5,259,018 | 11/1993 | Grimmett et al. | 455/89 |

FOREIGN PATENT DOCUMENTS

| | | |
|---|---|---|
| 0260549 | 9/1987 | European Pat. Off. . |
| 0372965 | 12/1989 | European Pat. Off. . |
| 0399176 | 3/1990 | European Pat. Off. . |
| 0521609 | 5/1992 | European Pat. Off. . |
| 62-168430 | 7/1987 | Japan ...................................... 455/90 |
| 62-141245 | 9/1987 | Japan . |
| 2-96448 | 4/1990 | Japan . |
| 3-109829 | 5/1991 | Japan ...................................... 455/89 |
| 8702847 | 5/1987 | WIPO . |

*Primary Examiner*—Chi H. Pham
*Attorney, Agent, or Firm*—Ostrolenk, Faber, Gerb & Soffen

[57] ABSTRACT

A portable radio device includes a radio device main body, a man-machine interface unit, a first interface unit, a fixing adaptor, and a cord. The radio device main body has a radio unit for transmitting/receiving a radio speech signal and a control unit for controlling a signal transmitting/receiving operation of the radio unit. The man-machine interface unit has a telephone transmitter unit and a telephone receiver unit, which are used for speech communication, and is detachably coupled to the radio device main body. The first interface unit electrically connects the radio device main body to the man-machine interface unit in a coupled state. The radio device main body is detachably mounted on the fixing adaptor. The fixing adaptor supplies power to the radio device main body in a mounted state of the radio device main body. The cord is detachably connected to the man-machine interface unit and electrically connects the man-machine interface unit to the radio device main body through the fixing adaptor.

10 Claims, 6 Drawing Sheets

PORTABLE RADIO DEVICE WITH ON-VEHICLE ADAPTOR SYSTEM

BACKGROUND OF THE INVENTION

The present invention relates to a portable radio device and, more particularly, a portable radio device which receives power from a car adaptor and can transmit/receive a transmission/reception signal.

A conventional radio device is used at various locations because it is compact and light-weight, and can be easily carried. When the radio device is used in an automobile, the radio device can perform radio communication with a distant station at a high output level by using a mobile antenna arranged on the automobile. For this reason, the portable radio device may use the mobile antenna. The portable radio device may be used such that the portable radio device is connected to the car adaptor to receive power from the car adaptor.

FIG. 5 shows an example of the above conventional portable radio device. Referring to FIG. 5, a portable radio device 10 is connected to a car adaptor 11 through a curled cord 12, and a connector 13 connected to the other end of the curled cord 12 having one end connected to the car adaptor 11 is inserted in a predetermined position of the portable radio device 10 and connected thereto. The car adaptor 11 is fixed at a predetermined position in the room of an automobile and connected to an external antenna (not shown) arranged outside the automobile through a high-frequency line 14, and the car adaptor 11 is connected to a car battery (not shown) through a power supply line 15.

In this manner, the portable radio device 10 receives power from the car adaptor 11 through the curled cord 12 and the connector 13 and can perform radio communication using the external antenna through the curled cord 12, the connector 13, and the car adaptor 11. In addition, the portable radio device 10 can be freely moved within an area where the curled cord 12 can extend. Therefore, the portable radio device 10 functions as a telephone transceiver connected to the external antenna through the curled cord 12.

FIG. 6 shows another conventional portable radio device. The same reference numerals as in FIG. 5 denote the same parts in FIG. 6, and a description thereof will be omitted. Referring to FIG. 6, a portable radio device 10 is mounted on a car adaptor 16, and the internal circuit of the portable radio device 10 is used except for its telephone transceiver unit. The car adaptor 16 is fixed at a predetermined position in an automobile room and connected to a telephone transceiver 18 through a curled cord 17.

More specifically, the conventional portable radio device 10 receives power through the car adaptor 16, and can perform radio communication using an external antenna and including a signal process, as in the prior art in FIG. 5. However, in the prior art in FIG. 6, unlike the portable radio device in FIG. 5, the telephone transceiver 18 is arranged for the car adaptor 16, and speech communication with a distant subscriber is performed using the telephone transceiver 18 through the curled cord 17.

However, although the conventional portable radio device shown in FIG. 5 uses the curled cord 12 to obtain a high degree of freedom in an operation, a transmission or reception signal is considerably attenuated when the signal is transmitted through the curled cord 12, and the reception sensitivity of the portable radio device decreases due to attenuation of a reception signal from the external antenna. In addition, the output level of a signal transmitted from the external antenna decreases.

According to the conventional portable radio device shown in FIG. 6, since the portable radio device itself is mounted on the car adaptor 16 without a curled cord, attenuation of a transmission/reception signal caused by the curled cord does not occur. However, the telephone transceiver 18 for speech communication in an automobile is required in addition to the portable radio device. For this reason, the cost increases by the telephone transceiver 18, and a space is required for storing the telephone transceiver 18. Therefore, use of the portable radio device in the limited space of the automobile poses a problem.

SUMMARY OF THE INVENTION

It is an object of the present invention to provide a portable radio device which receives power from an external battery and transmits/receives a signal using an external antenna.

It is another object of the present invention to provide a portable radio device in which attenuation of a high-frequency signal caused by a cord is reduced.

It is still another object of the present invention to provide a portable radio device designed to reduce costs and effectively use a space.

In order to achieve the above objects, according to the present invention, there is provided a portable radio device comprising a radio device main body having a radio unit for transmitting/receiving a radio speech signal and a control unit for controlling a signal transmitting/receiving operation of the radio unit, a man-machine interface unit having a telephone transmitter unit and a telephone receiver unit, which are used for speech communication, and detachably coupled to the radio device main body, first interface means for electrically connecting the radio device main body to the man-machine interface unit in a coupling state, a fixing adaptor, on which the radio device main body is detachably mounted, for supplying power to the radio device main body in a mounted state of the radio device main body, and a cord, detachably connected to the man-machine interface unit, for electrically connecting the man-machine interface unit to the radio device main body through the fixing adaptor.

DESCRIPTION OF THE PREFERRED EMBODIMENT

Figure 1A:
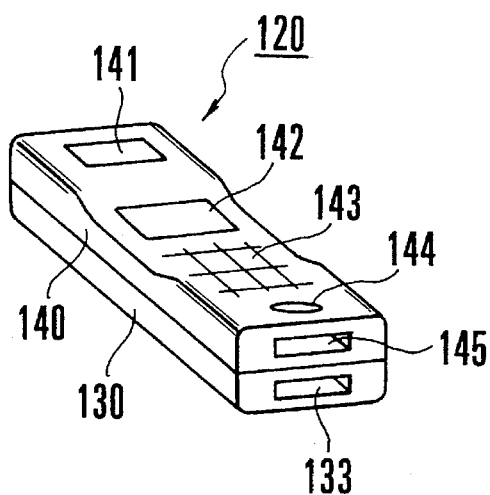
FIG. 1A is a perspective view of a portable radio device according to the present invention.

An embodiment of the present invention will be described below. FIG. 1A shows an embodiment of a portable radio device according to the present invention, FIG. 1B explains a state in which the portable radio device shown in FIG. 1A is used, and FIGS. 2A and 2B show a state wherein the portable radio device shown in FIG. 1A is mounted on a car adaptor. As shown in FIG. 1A, a portable radio device 120 according to the embodiment of the present invention has an arrangement in which a radio device main body 130 and a man-machine interface unit (to be referred to as an MMI unit hereinafter) 140 are detachably mounted on the radio device main body 130.

The MMI unit 140 is a component unit having a transceiver function and is directly related to a user on an operation. A telephone receiver unit 141, a display unit 142 for displaying various messages or the like required for using the portable radio device, a ten-key pad 143 used for inputting a telephone number or the like, a telephone transmitter unit 144 for transmitting speech of the user, and the like are arranged on the surface of the housing of the MMI unit 140. The radio device main body 130 includes a radio unit and a control unit (to be described later), and is constituted by all elements constituting the portable radio device except for the elements constituting the MMI unit 140.

An interface unit 133 for high-frequency and control signals and an interface unit 134 for connecting the radio device main body 130 to the MMI unit 140 are arranged in the radio device main body 130. Similarly, an interface unit 145 for a control signal and an interface unit 146 for connecting the MMI unit 140 to the radio device main body 130 are arranged in the MMI unit 140. As shown in FIG. 1A, in normal use wherein the portable radio device 120 is used as a portable telephone device, the radio device main body 130 is physically combined with the MMI unit 140. At this time, the interface units 134 and 146 are electrically connected to each other. Therefore, the portable radio device 120 has the same arrangement as that of a conventional portable radio device. In this case, the portable radio device 120 is operated using a built-in battery as a power supply.

Figure 3:
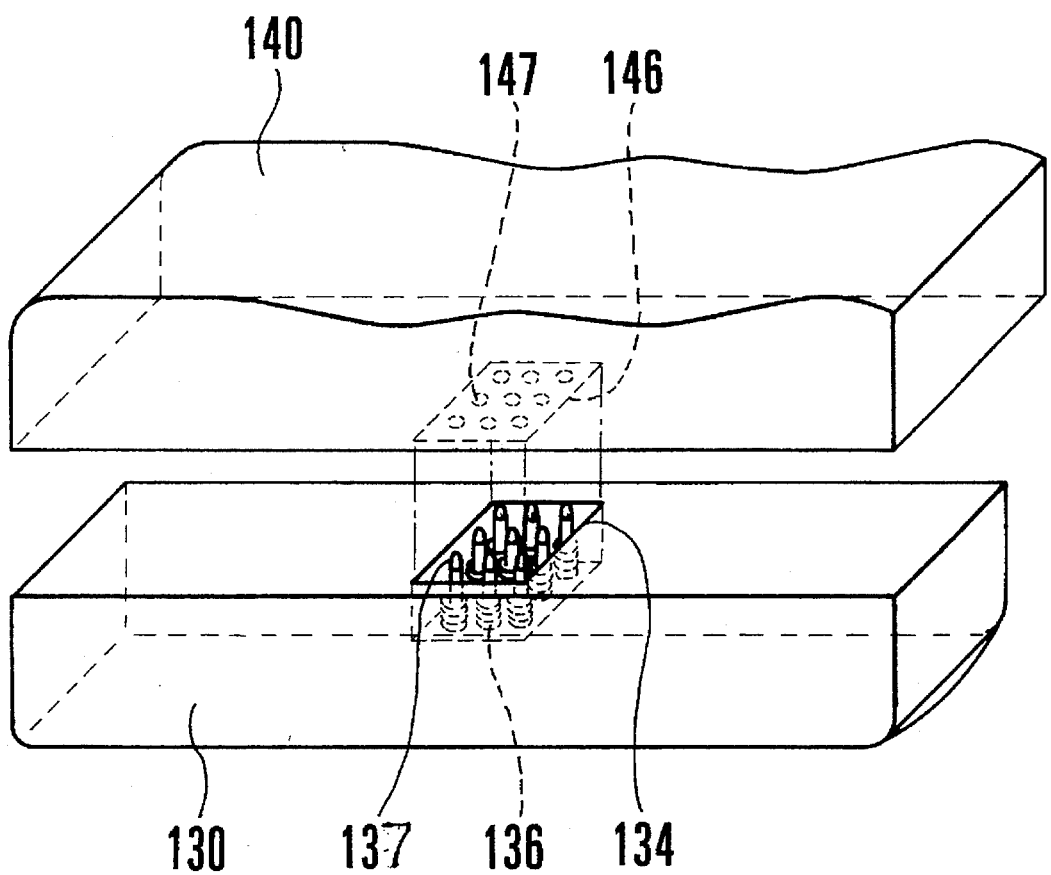
FIG. 3 is a view for explaining the electrical connection between a radio device main body and a man-machine interface unit which constitute the portable radio device shown in FIG. 1A.

FIG. 3 explains the electrical connection between the MMI unit 140 and the radio device main body 130. Referring to FIG. 3, the interface unit 134 of the radio device main body 130 has a plurality of signal pins 137 to perform signal communication with the interface unit 146 of the MMI unit 140. The signal pins 137 are pressed upward by springs 136 outside the radio device main body 130. In addition, the interface unit 146 of the MMI unit 140 has a plurality of contact points 147 corresponding to the signal pins 137. When the radio device main body 130 is connected to the MMI unit 140, the springs 136 bring the signal pins 137 into contact with the contact points 147, thereby electrically connecting the signal pins 137 to the contact points 147. This electrical connection is electrically disconnected by an internal switch 135 (to be described later) of the radio device main body when connectors 113 and 163 of the car adaptor 111 are connected to the radio device main body 130 and the MMI unit 140, respectively.

Figure 1B:
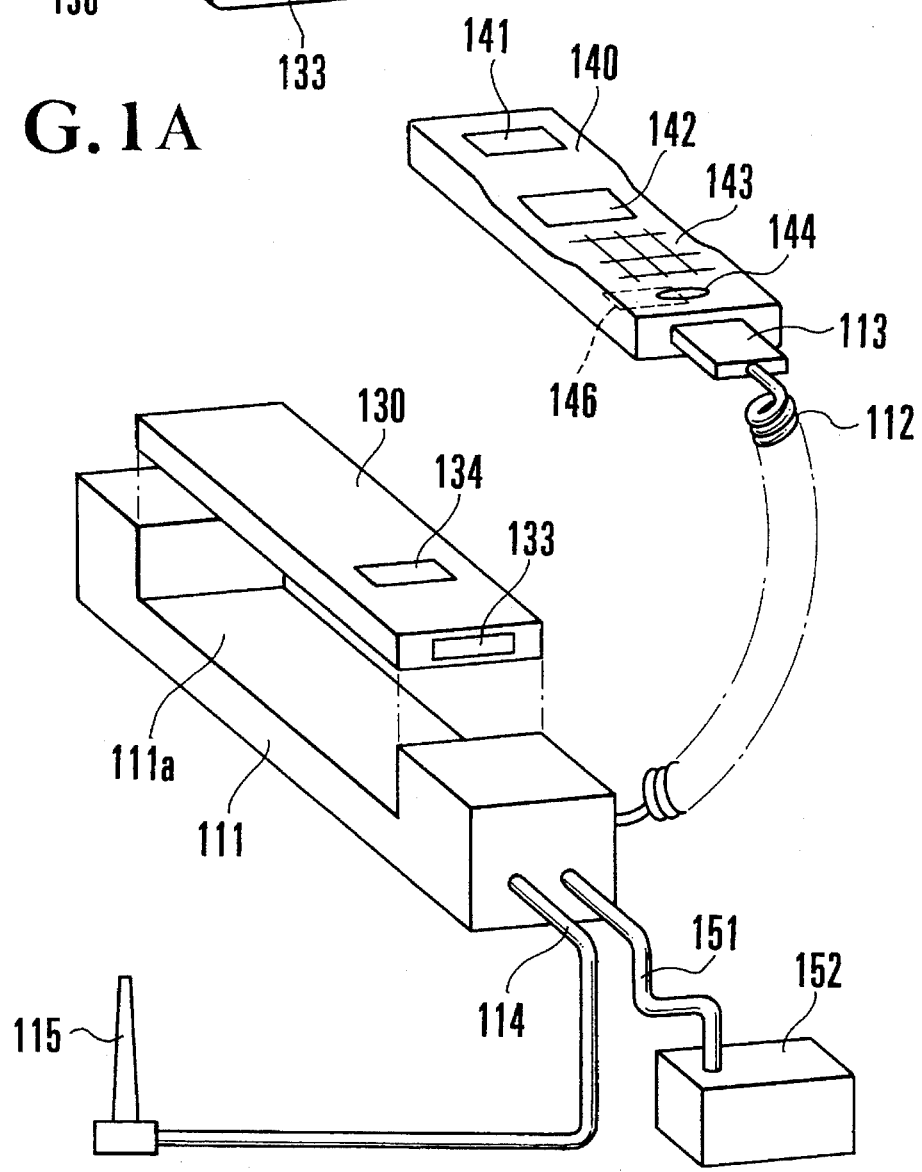
FIG. 1B is a view for explaining a state in which of the portable radio device in FIG. 1A is used.
Figure 2A:
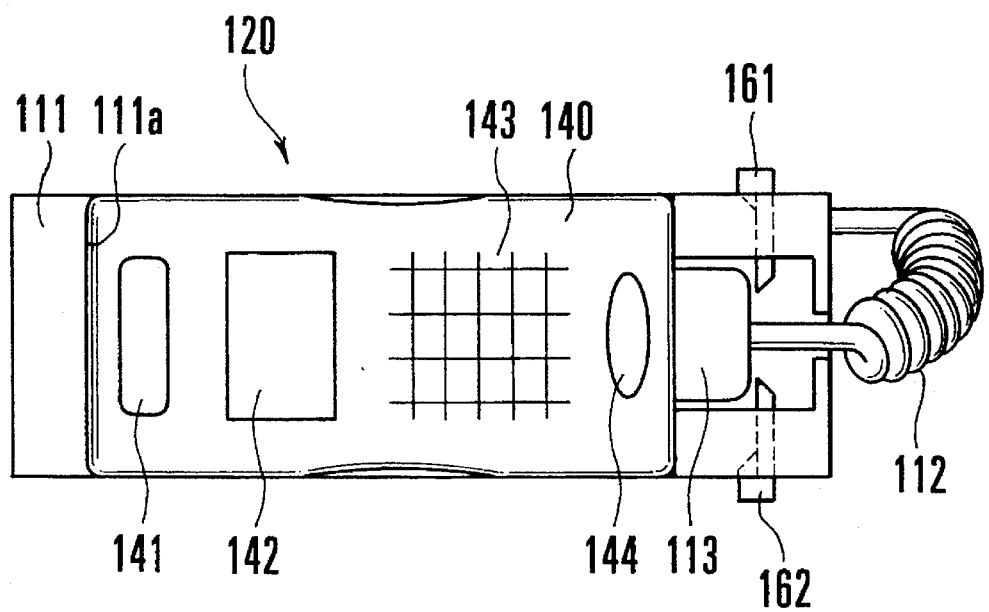
FIG. 2A is a plan view of the portable radio device shown in FIG. 1A.
Figure 2B:
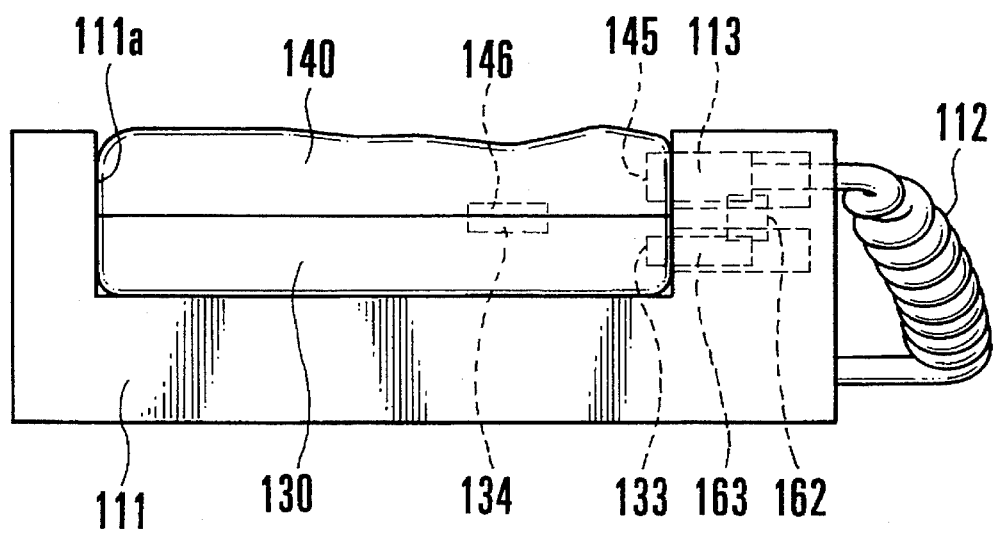
FIG. 2B is a side view of the portable radio device shown in FIG. 1A.

On the other hand, when the portable radio device 120 is used as a mobile telephone device using a car adaptor 111 as a fixing adaptor, as shown in FIG. 1B, the radio device main body 130 is fitted on a recessed portion 111a of the car adaptor 111, and is directly connected to the car adaptor 111 by the interface unit 133 and the connector 163 without a connection line. In addition, the MMI unit 140 is connected to the car adaptor 111 such that the interface unit 145 is fitted on and connected to the connector 113. The connector 113 is connected to the car adaptor 111 through a curled cord 112.

The car adaptor 111 is connected, through a high-frequency line 114, to an external antenna 151 arranged at a predetermined external position of the automobile, and is connected, through a power supply line 115, to an external battery 152 constituted by a car battery. With this arrangement, when the portable radio device 120 is used as a mobile telephone device, the MMI unit 140 is separated from the radio device main body 130 mounted on the car adaptor 111, and the MMI unit 140 is used as a handset.

A connecting operation which connects the radio device main body 130 to the car adaptor 111 and is performed when the portable radio device 120 is used as a mobile telephone device will be described below in detailed with reference to FIGS. 2A and 2B. In a state wherein the radio device main body 130 is combined with the MMI unit 140 to electrically connect the interface units 134 and 146 to each other, the portable radio device 120 is fitted in the recessed portion 111a of the car adaptor 111 from the radio device main body 130 side.

Connector connection pawls 161 and 162 are moved toward the portable radio device, and, as shown in FIG. 2B, the connector 113 is inserted into and connected to the interface unit 145 of the MMI unit 140. At the same time, the connector 163 is inserted into and connected to the interface unit 133 of the radio device main body 130. The connector 163 is connected to the power supply line 115 through the high-frequency line 114 in the car adaptor 111.

At this time, a control unit 131 (FIG. 3) in the radio device main body 130 detects that the connectors 113 and 163 are inserted into and connected to the interface units 145 and 133, respectively, and the control unit 131 electrically interrupts the connection between the interface units 134 and 146. In this manner, the portable radio device 120 can be used while the MMI unit 140 is separated from the radio device main body 130.

Figure 4:
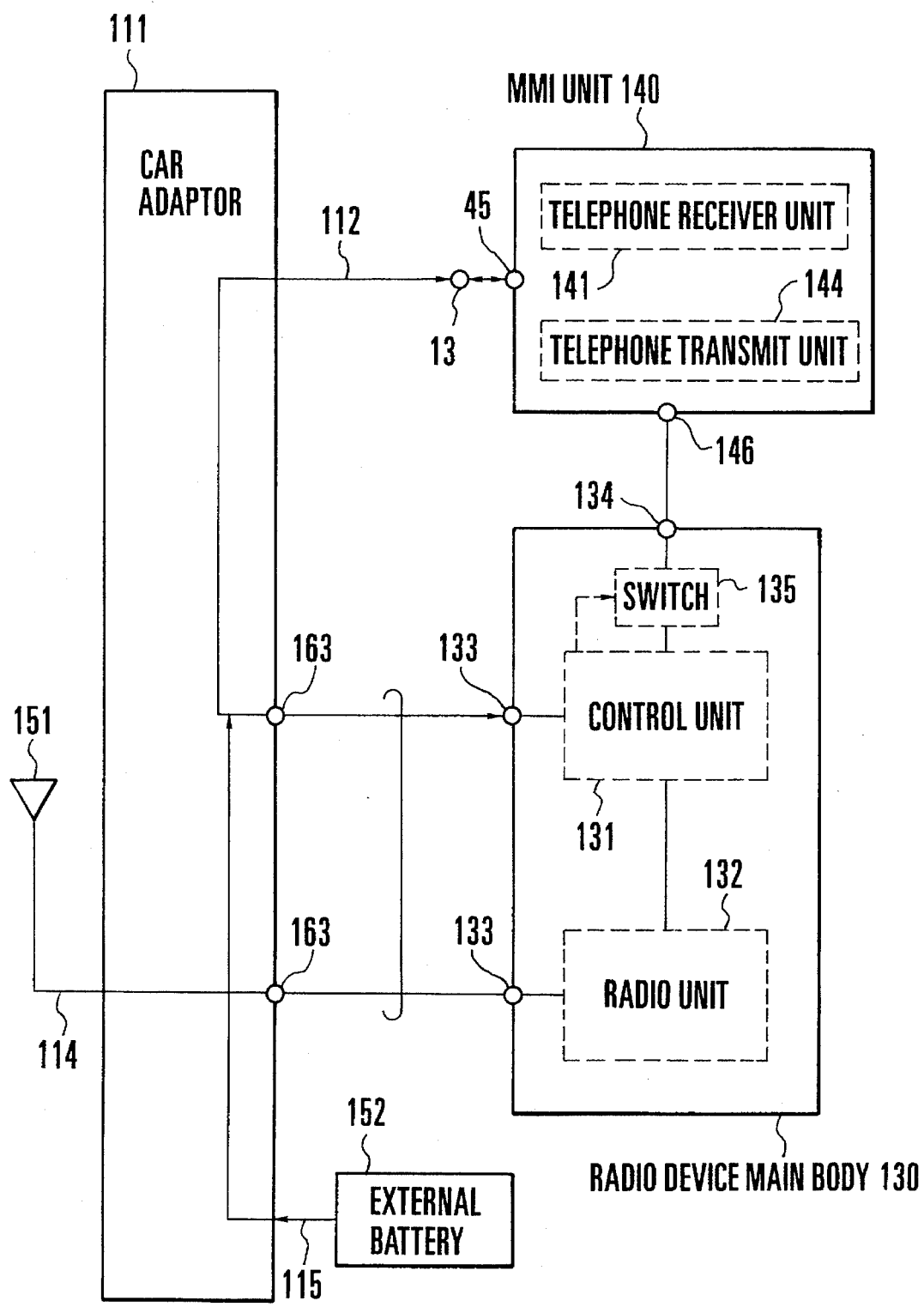
FIG. 4 is a block diagram showing an electrical arrangement obtained when the portable radio device shown in FIG. 1A is mounted on a car adaptor.
Figure 5:
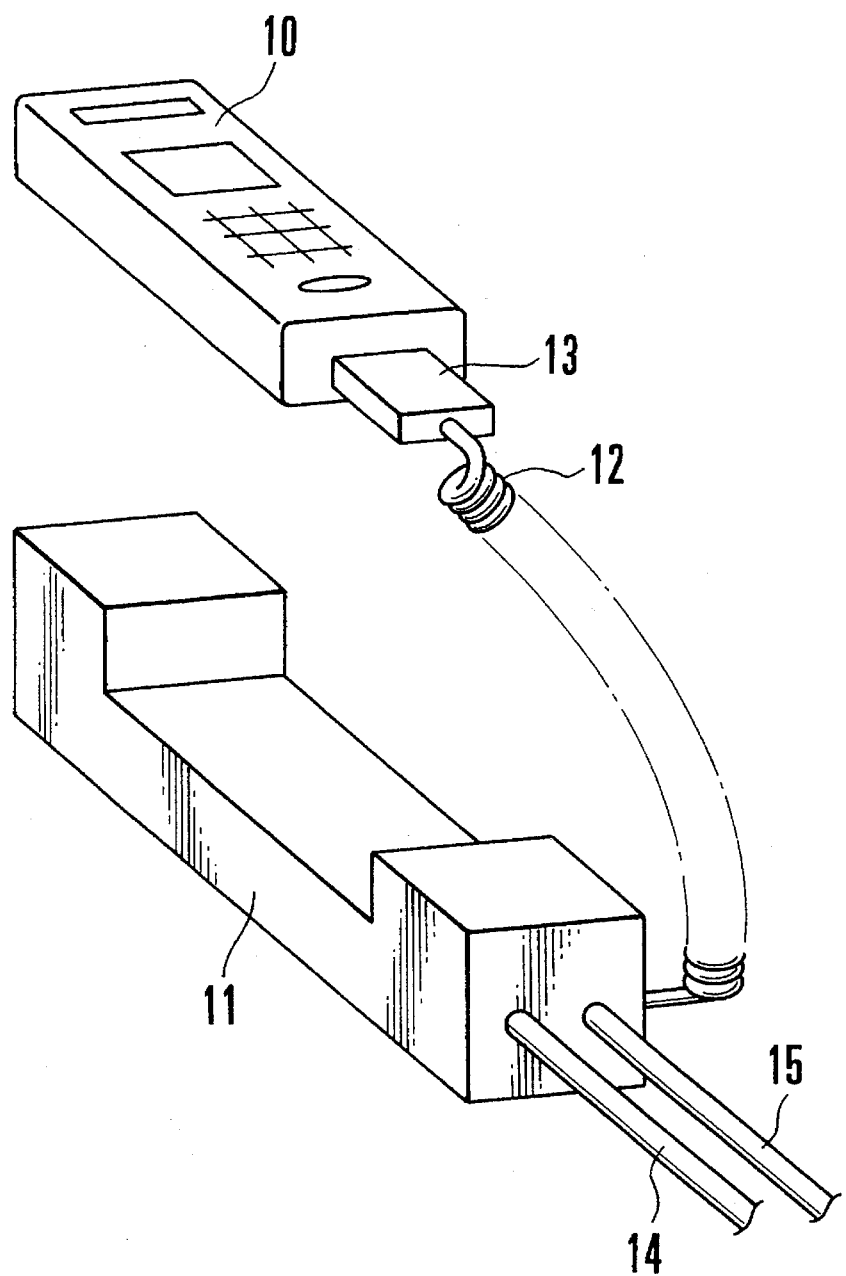
FIG. 5 is a perspective view showing a conventional portable radio device.
Figure 6:
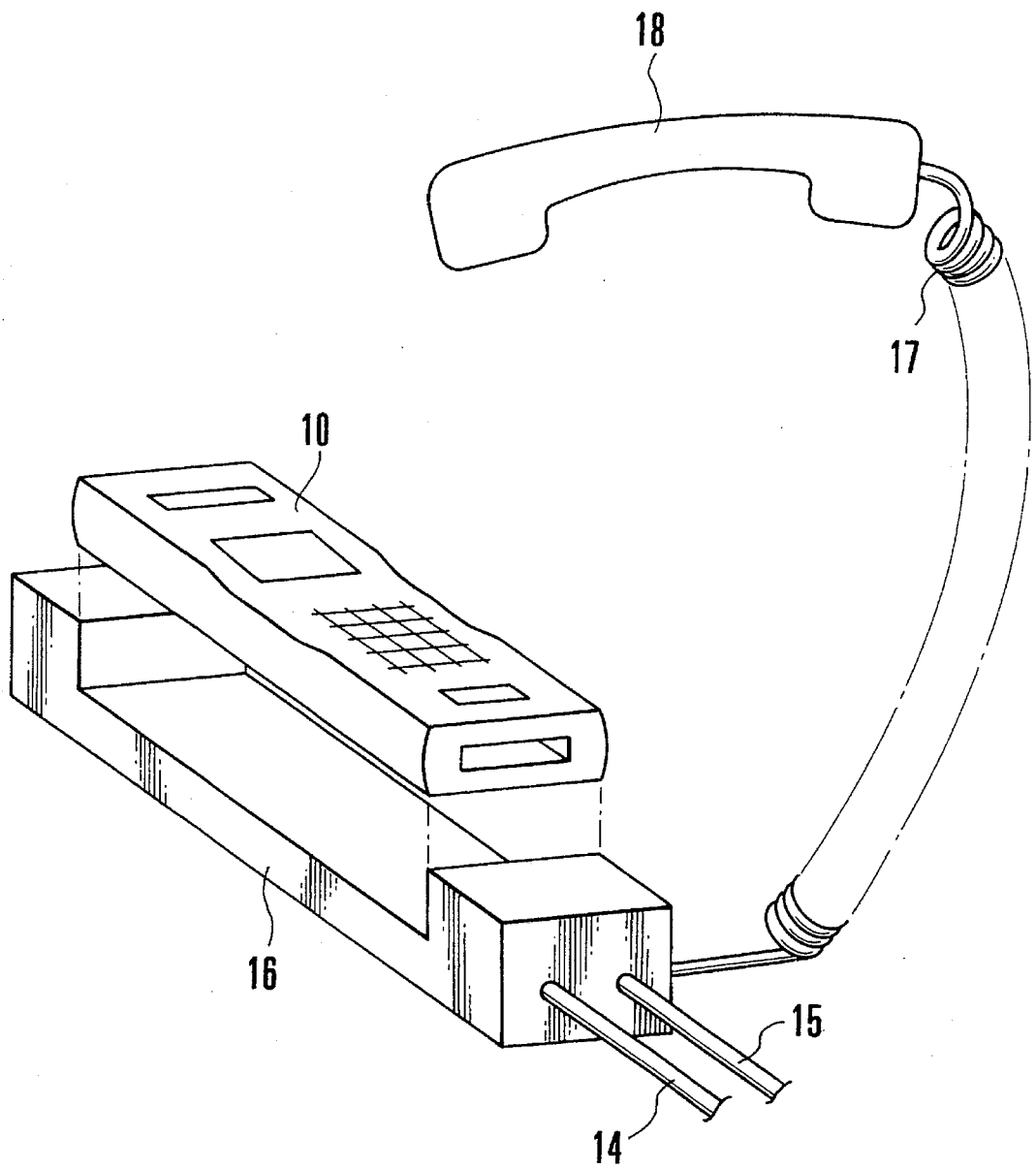
FIG. 6 is a perspective view showing another conventional portable radio device.

The portable radio device 120 and the car adaptor 111 in a state wherein the portable radio device 120 is connected to the car adaptor 111 as described above have the arrangement shown in a block diagram of FIG. 4. The same reference numerals as in FIGS. 1 and 2 denote the same parts in FIG. 4, and a description thereof will be omitted. Referring to FIG. 4, the radio device main body 130 includes the control unit 131 for controlling a radio transmitting/receiving operation, a radio unit 132 for transmitting/receiving a radio speech signal, and the switch 135 for interrupting the electrical connection between the radio device main body 130 and the MMI unit 140. When the radio device main body 130 is connected to the car adaptor 111, the control unit 131, as described above, controls the switch 135 to electrically interrupt the connection between the interface unit 134 of the radio device main body 130 and the interface unit 146 of the MMI unit 140.

On the other hand, the radio unit 132 is connected to the external antenna 151 through the interface unit 133, the connector 163, the car adaptor 111, and the high-frequency line 114. In addition, the control unit 131 is connected, through the interface unit 133, the connector 163, the car adaptor 111, the curled cord 112, the connector 113, and interface unit 145, to the MMI unit 140 including the telephone receiver unit 141 and the telephone transmitter unit 144.

With the above connection, power input from the external battery 152 to the car adaptor 111 through the power supply line 115 is connected to the radio device main body 130 through the connector 163 and the interface unit 133, and is supplied to the MMI unit 140 through the curled cord 112, the connector 113, and the interface unit 145.

A speech signal from the telephone transmitter unit 144 of the MMI unit 140 is supplied to the radio device main body 130 through the interface unit 145, the connector 113, the curled cord 112, the car adaptor 111, the connector 163, and the interface unit 133. This speech signal is subjected to a predetermined signal process in the radio device main body 130 and converted into a high-frequency transmission signal. The resultant signal is output from the radio unit 132 through the interface unit 133, the connector 163, the car adaptor 111, and the high-frequency line 114 and transmitted from the external antenna 151. A high-frequency reception signal received by the external antenna 151 passes through a path reverse to the path through which the transmission signal passes and is input to the MMI unit 140 through the radio device main body 130, thereby causing the telephone receiver unit 141 to generate speech.

A control signal for the man-machine interface is transmitted/received between the control unit 131 of the radio device main body 130 and the MMI unit 140 through the interface unit 133, the connector 163, the car adaptor 111, the curled cord 112, the connector 113, and the interface unit 145.

As described above, according to this embodiment, since the radio device main body 130 is directly connected to the car adaptor 111 without a connection line, a high-frequency signal transmitted/received from/by the radio unit 132 is not attenuated by a connection line, especially, a curled cord. For this reason, a transmission output level and reception sensitivity which are higher than those of a conventional device can be obtained.

In addition, since the MMI unit 140 can be used as a handset when the portable radio device of the embodiment is used as a mobile telephone device, a high degree of freedom on an operation can be obtained. When the portable radio device of the embodiment is not used as a mobile telephone device, the MMI unit 140 is mounted on the radio device main body 130, and a space for storing the MMI unit 140 is not required. For the reason, the portable radio device of this embodiment is preferably used in an automobile.

As has been described above, according to the present invention, since attenuation of a high-frequency transmission/reception signal caused by a curled cord can be prevented, the output level of a signal transmitted from an external antenna can be made higher than that of a prior art, and the sensitivity of a high-frequency reception signal received by the external antenna can be increased.

According to the present invention, since a man-machine interface unit is set to be mounted on a radio device main body in a speech communication disable state, a specific space for storing the man-machine interface unit is not required. For this reason, the limited space in an automobile can be effectively used.

In addition, according to the present invention, the man-machine interface unit can be automatically connected to the radio device main body through a fixing adaptor by mounting the radio device main body on the fixing adaptor. For this reason, even when a user does not perform other operations except for an operation for directly connecting the radio device main body to the fixing adaptor, an arrangement having excellent operability can be obtained. In addition, when the portable radio device is applied to a car adaptor serving as a fixing adaptor, the portable radio device can be used as a mobile telephone device using the external antenna of an automobile.

What is claimed is:

1. A portable radio device comprising:
   a radio device main body having a radio unit for transmitting/receiving a radio speech signal and a control unit for controlling a signal transmitting/receiving operation of said radio unit;
   a man-machine interface unit having a telephone transmitter unit and a telephone receiver unit, which are used for speech communication, and detachably coupled to said radio device main body;
   a first interface for electrically connecting said radio device main body to said man-machine interface unit in a coupled state;
   a fixing adaptor, on which said radio device main body is detachably mounted, for supplying power to said radio device main body in a mounted state of said radio device main body; and
   a cord, detachably connected to said man-machine interface unit, for electrically connecting said man-machine interface unit to said radio device main body through said fixing adaptor when said radio device main body is mounted on said fixing adaptor.

2. A device according to claim 1, further comprising a switch for electrically disconnecting said radio device main body from said man-machine interface unit when said radio device main body is mounted on said fixing adaptor, a second interface for electrically connecting said fixing adaptor to said man-machine interface unit when said radio device main body is mounted on said fixing adaptor, and a third interface for electrically connecting said man-machine interface unit to said cord connected to said fixing adaptor.

3. A device according to claim 2, wherein said switch is arranged in said radio device main body, and said control unit of said radio device main body detects that the second and third interfaces are connected, thereby controlling a disconnecting operation of said switch.

4. A device according to claim 2, wherein said fixing adaptor is connected to an external battery and an external antenna, and when said radio device main body is mounted on said fixing adaptor, said fixing adaptor supplies power from said external battery to said man-machine interface unit through said cord and said third interface, supplies power from said external battery to said radio device main body through said second interface, and connects said radio device main body to said external antenna.

5. A device according to claim 4, wherein said fixing adaptor is arranged in an automobile, said external antenna is constituted by a mobile antenna arranged on the automobile, and said external battery is constituted by a mobile battery mounted in the automobile.

6. A device according to claim 4, wherein a speech signal from/to said telephone receiver unit of said man-machine interface unit/said telephone transmitter unit is input to/output from said radio device main body through said third interface, said cord, said fixing adaptor, and said second interface, and said radio unit of said radio device main body performs a conversion operation between a high-frequency signal and a speech signal and an input/output operation of a high-frequency signal with said external antenna through said second interface and said fixing adaptor.

7. A device according to claim 2, wherein said man-machine interface unit having said third interface set in a disconnected state is coupled to said radio device main body having said second interface set in a disconnected state when said first interface is set in a connected state, thereby constituting a portable radio telephone device.

8. A device according to claim 2, wherein said first, second, and third interfaces include detachable connector members, respectively.

9. A portable radio device comprising:

a radio device main body having a radio unit for transmitting/receiving a radio speech signal and a control unit for controlling a signal transmitting/receiving operation of said radio unit;

a man-machine interface unit having a telephone transmitter unit and a telephone receiver unit, which are used for speech communication, and detachably coupled to said radio device main body; and a fixing adaptor, on which said radio device main body is detachably mounted, for supplying power to said radio device main body in a mounted state of said radio device main body, wherein, when said radio device main body is mounted on said fixing adaptor, said man-machine interface unit is electrically connected to said radio device main body through said adaptor, and, when said radio device main body is not mounted on said adaptor, said man-machine interface unit is coupled to said radio device main body, thereby directly, electrically connecting said man-machine interface unit to said radio device main body.

10. A portable radio device comprising:

a radio device main body having a radio unit for transmitting/receiving a radio speech signal and a control unit for controlling a signal transmitting/receiving operation of said radio unit;

a man-machine interface unit having a telephone transmitter unit and a telephone receiver unit, which are used for speech communication, and detachably coupled to said radio device main body;

a first interface for electrically connecting said radio device main body to said man-machine interface unit in a coupled state;

a fixing adaptor, which is arranged in an automobile and connected to a mobile battery and a mobile antenna, and on which said radio device main body is detachably mounted, for supplying power to said radio device main body in a mounted state of said radio device main body;

a cord, detachably connected to said man-machine interface unit, for electrically connecting said man-machine interface unit to said radio device main body through said fixing adaptor;

a switch for electrically disconnecting said radio device main body from said man-machine interface unit when said radio device main body is mounted on said fixing adaptor;

a second interface for electrically connecting said fixing adaptor to said man-machine interface unit when said radio device main body is mounted on said fixing adaptor; and a third interface for electrically connecting said man-machine interface unit to said cord connected to said fixing adaptor, wherein, when said radio device main body is mounted on said fixing adaptor, said fixing adaptor supplies power from said mobile battery to said man-machine interface unit through said cord and said third interface, supplies power from said mobile battery to said radio device main body through said second interface, and connects said radio device main body to said mobile antenna.

* * * * *